United States Patent [19]

Cameron et al.

[11] Patent Number: 5,006,721

[45] Date of Patent: Apr. 9, 1991

[54] LIDAR SCANNING SYSTEM

[75] Inventors: Evan S. Cameron, Midland, Canada; Ronald P. Szumski, Raleigh, England; James K. West, Farmington Hills, Mich.

[73] Assignee: Perceptron, Inc., Farmington Hills, Mich.

[21] Appl. No.: 499,068

[22] Filed: Mar. 23, 1990

[51] Int. Cl.$^5$ .............................................. G01N 21/86
[52] U.S. Cl. .......................................... 250/561; 356/5
[58] Field of Search ................................ 250/234–236, 250/223 R, 560, 561; 356/1, 4, 5, 376

[56] References Cited

U.S. PATENT DOCUMENTS

| | | | |
|---|---|---|---|
| 3,901,597 | 8/1975 | White | 356/4 |
| 3,914,596 | 10/1975 | Finkel et al. | 250/223 R |
| 4,687,325 | 8/1987 | Corby, Jr. | 356/4 |
| 4,926,050 | 5/1990 | Shemwell | 356/4 |

OTHER PUBLICATIONS

Machine Vision and Applications, 1988, Springer-Verlag New York Inc., pp. 127–152, "Active, Optical Range Imaging Sensors".
Applied Optics, vol. 23, No. 21, Nov. 1, 1984, "Laser Range Finder Based on Synchronized Scanners", pp. 3837–3844.
SPIE, vol. 1007, Mobile Robots III, 1988, "Real Time Imaging Rangefinder For Autonomous Land Vehicles", pp. 349–356.

*Primary Examiner*—David C. Nelms
*Assistant Examiner*—K. Shami
*Attorney, Agent, or Firm*—Harness, Dickey & Pierce

[57] ABSTRACT

A LIDAR scanning system having a rotating multifaceted polygon mirror for transmitting modulated light from one of its facets to a surface. Diffuse light reflected off said surface is received by another facet of the polygon mirror and reflected to a photo detector. The phase difference between the transmitted and received light is then used to compute the range of the surface from the scanning system. The intensity of the returned light is used to create a gray scale image of the surface. The use of separate optical paths for the transmitted and returned light, and a small scanned field of view results in an improved signal-to-noise ratio.

13 Claims, 6 Drawing Sheets

LIDAR SCANNING SYSTEM

BACKGROUND AND SUMMARY OF THE INVENTION

This invention relates to a Light Distancing and Ranging scanner (LIDAR) and particularly to a LIDAR scanner employing a rotating polygon mirror for directing the scanned and received light.

Three-dimensional imaging systems have improved the performance of a wide variety of automation systems. While three-dimensional images can be computed from multiple sets of two-dimensional images, this approach is more complex and less accurate than systems which collect images that are fundamentally three-dimensional. In general, these systems collect large amounts of three-dimensional coordinate data from visible surfaces in a scene. This data consists of image data points that explicitly represent scene surface geometry of each sampled point by utilizing range information for each point.

One approach to three-dimensional vision is the "time of light" approach which measures the range at given points by measuring the timing of the return of a pulse of light projected on a target. Unfortunately, the extreme electronic speed required for this approach severely limits the resolution of such systems. LIDAR systems avoid the problems of the time of light approach by modulating a light beam and comparing the modulation of the transmitted and returned signal to determine range. For instance, coherent frequency modulator (FM) LIDAR incorporates frequency modulation/mixing to determine range. However, FM LIDAR systems suffer from the limited frequency modulation capabilities of current laser diodes. Phase shift (AM) LIDAR is a preferred approach which correlates the phase shift between outgoing and incoming amplitude modulated light beams to determine range. As a result, each pixel in a collected image is an individual range measurement, and the resulting image is somewhat like a "terrain map" of the scanned area. When the range information is combined with the two-dimensional image, true three-dimensional vision is accomplished.

A number of difficulties are encountered in the opto-mechanical design of LIDAR systems. One is achieving an acceptable signal-to-noise ratio. For example, LIDAR scanning systems often utilize the same optical path for the transmitted and received light. However, small particles of dirt or scratches in the optical elements, or windows, can cause the transmitted light to be received directly back into the receive optics as noise or crosstalk.

Further, LIDAR systems frequently receive light from the entire scanned volume simultaneously. In these systems the field of view is the same as the scanned volume. This approach, however, yields a relatively small signal-to-noise ratio for a given output of light power. One alternative approach is to receive the reflected radiation via a scanning system so that the field of view of the receiving optical subsystem is very small. This increases the signal-to-noise ratio to permit better accuracy and to allow the use of a lower output light transmitter. Further, in such systems since the transmitted light beam is relatively narrow and the field of view of the receiver optics is narrow, it is easier to construct a system where the outgoing and incoming light beams are not coaxial and do not coincide. One approach, for example, uses dual rotating polygon mirrors, one for transmitting the scanning output beam and the other rotating polygon mirror being employed to receive the incoming reflected light. However, the dual rotating polygon approach presents alignment problems to ensure that the field of view is coincident with the transmitted light.

Thus, it is desirable to provide an improved three-dimensional imaging system which employs amplitude modulated LIDAR with an improved signal-to-noise ratio. Further, it is desirable to provide a LIDAR system in which the transmit and receive beams are not coaxial to reduce unwanted reflections and crosstalk. In addition, it is desirable to have a LIDAR system which employs a small field of view that is scanned along with the transmitted beam and which avoids the use of separate polygons that must be accurately aligned.

A LIDAR scanning system achieving the above-mentioned desirable features is provided according to this invention. The LIDAR scanning system includes a single rotating faceted polygon mirror for receiving and reflecting a transmitted light beam along a linear path as the polygon mirror rotates. Diffuse light reflected from the scanned surface is received by the rotating polygon mirror along an optical path at a small parallax angle relative to the transmitted optical path. The received light is reflected by the rotating polygon mirror and directed to a sensor. The transmitted and returned beams are reflected by adjacent facets of the polygon mirror. In this way, the field of view of the sensor is scanned and is coincident with the point on the object receiving the scanned light.

In accordance with another embodiment of the present invention, the scanning system also employs a tilting mirror which reflects both transmitted and received light for creating a linear scan and receive pattern. The tilting mirror creates scans along multiple positions of the Y-axis to generate a rectangular frame scan.

Additional benefits and advantages of the present invention will become apparent to those skilled in the art to which this invention relates, from the subsequent description of the preferred embodiments and the appended claims, taken in conjunction with the accompanying drawings.

DETAILED DESCRIPTION OF THE INVENTION

Figure 1:
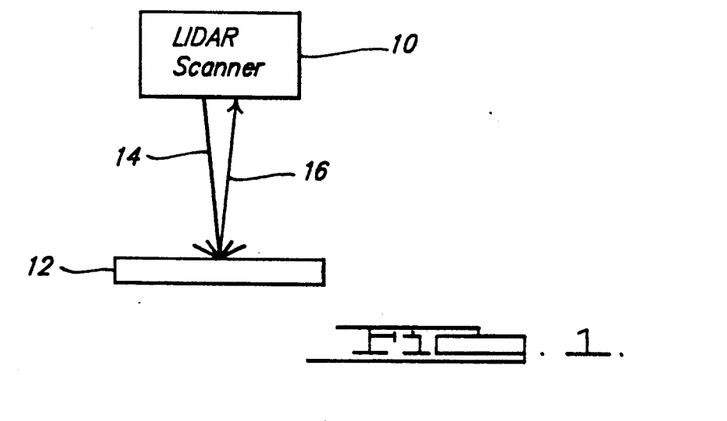
FIG. 1 is a diagram of the LIDAR scanner in accordance with the invention showing the path of the scan beam reflected from a scanned surface.

A LIDAR scanner 10 in accordance with the present invention is shown in FIG. 1. The LIDAR scanner 10 obtains image and range information from a surface 12 by transmitting a beam of light 14 to the object surface 12 and detecting a diffuse portion 16 of the transmitted light 14 which returns to the scanner 10. While surface 12 is shown to be flat for sake of simplicity, it will be appreciated that typically surfaces of objects to be scanned will be optically rough and will produce diffuse reflected light. In accordance with the present invention, a small parallax angle exists between the outgoing beams 14 and incoming beams 16. While this angle is exaggerated in FIG. 1 for illustration purposes, this angle will typically be less than 0.5 degrees. This parallax angle reduces the effects of light scatter and cross-talk by allowing the two beams 14, 16 to use different optical elements. In addition, it is important that the parallax angle remain relatively small to minimize the "shadow effect" problems associated with larger angular separation between the projection and detection axes. This helps to ensure good acuity around steep surface 12 transitions.

Figure 2:
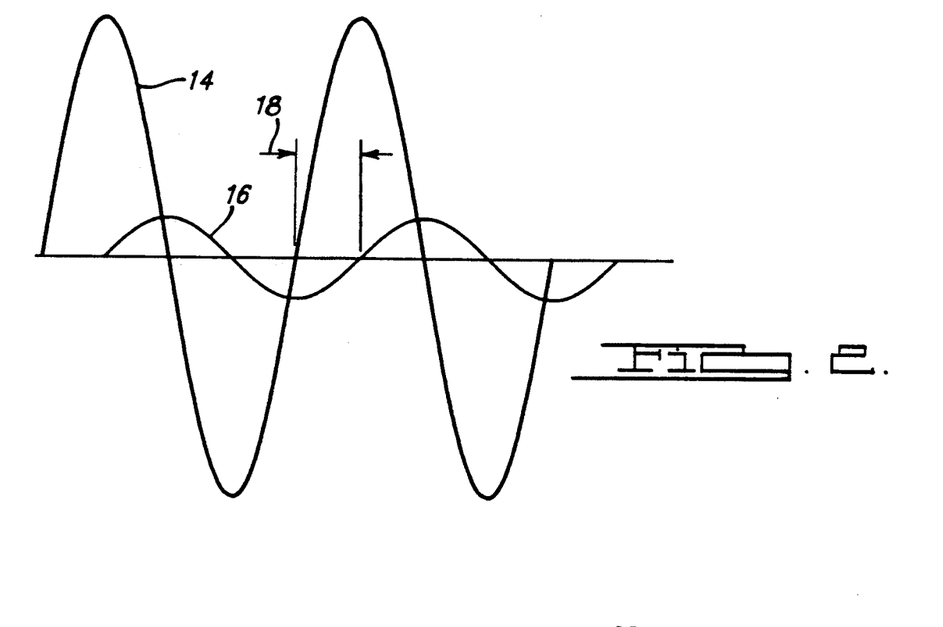
FIG. 2 is a diagram of the outgoing and returning amplitude modulated light signal indicating the phase shift due to the distance of the light path.

FIG. 2 shows how a phase shift measurement is performed by comparing the relative offset of the positive-going zero crossings of the outgoing and incoming modulated signals. The outgoing modulated beam 14 is shown as an amplitude modulated signal at relatively high power. The return signal 16 is also modulated and is typically six orders of magnitude less in amplitude than the outgoing signal 14. The phase shift 18 between the outgoing signal 14 and returning signal 16 can be correlated into an accurate range measurement by the use of pre-established calibration data. That is, by knowing the distance that the amplitude modulated wave travels during one cycle of modulation and the particular phase shift of the return signal relative to the outgoing signal, the distance of the object relative to a pre-established datum can be determined. It should be noted that current circuitry cannot differentiate between adjacent cycles of the amplitude modulated wave. Therefore, ranging can only be accomplished over one wavelength of the modulated wave.

Figure 3:
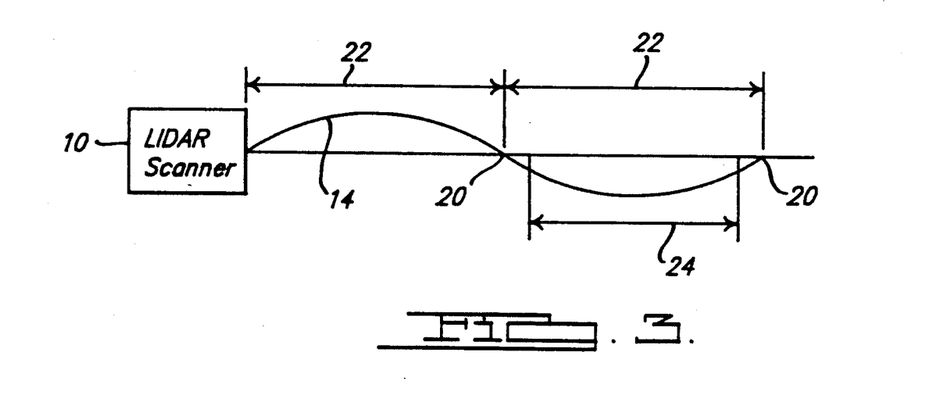
FIG. 3 is a diagram of the amplitude modulated light signal indicating the tunable standoff, ambiguity interval, and measurement range of the LIDAR scanner.

Referring now to FIG. 3, the manner in which the measurement range of the scanner 10 is established will now be explained. Since the scanner 10 determines range by comparing the relative phase shift of the incoming signal to the outgoing signal, it will be appreciated that a surface 12 located one-half of a wavelength of the modulated wave away from a zero crossing point in the waveform (a distance designated 22 in FIG. 3) will result in a reflected signal exactly 360 degrees out of phase with the transmitted signal (i.e., one-half wavelength to reach the surface and one-half wavelength to return). Accordingly, since the scanner cannot detect a phase shift of 360 degrees, it will be appreciated that an "ambiguity interval" 20 occurs once each half cycle of the modulated waveform. Therefore, to prevent an ambiguity interval from occurring within the measuring zone of the scanner 10, the depth of the measuring zone must be limited to less than one-half of a wavelength. In practice, the usable measuring range 24 is limited to a distance corresponding to slightly less than one-half of a wavelength due to the higher noise content present in the reflected signal adjacent the ambiguity intervals 20. Typically, 90 percent or more of the half wavelength is useful for ranging.

Accordingly, to create a desired measuring range 24, the transmitted light signal 14 must be modulated at an appropriate frequency. For example, to create a measuring range 24 of 40 inches, a modulation frequency of 147.5 MHz is required. In addition, as will subsequently be described in greater detail, the spatial positioning of the ambiguity intervals 20 can be adjusted during calibration of the scanner 10 to define the desired spatial position of the measuring range relative to the scanner, referred to as the scanner "standoff". Preferably, the point of focus of the light source transmitting telescope optics is also set to be coincident with the center of the measuring range 24.

Figure 4:
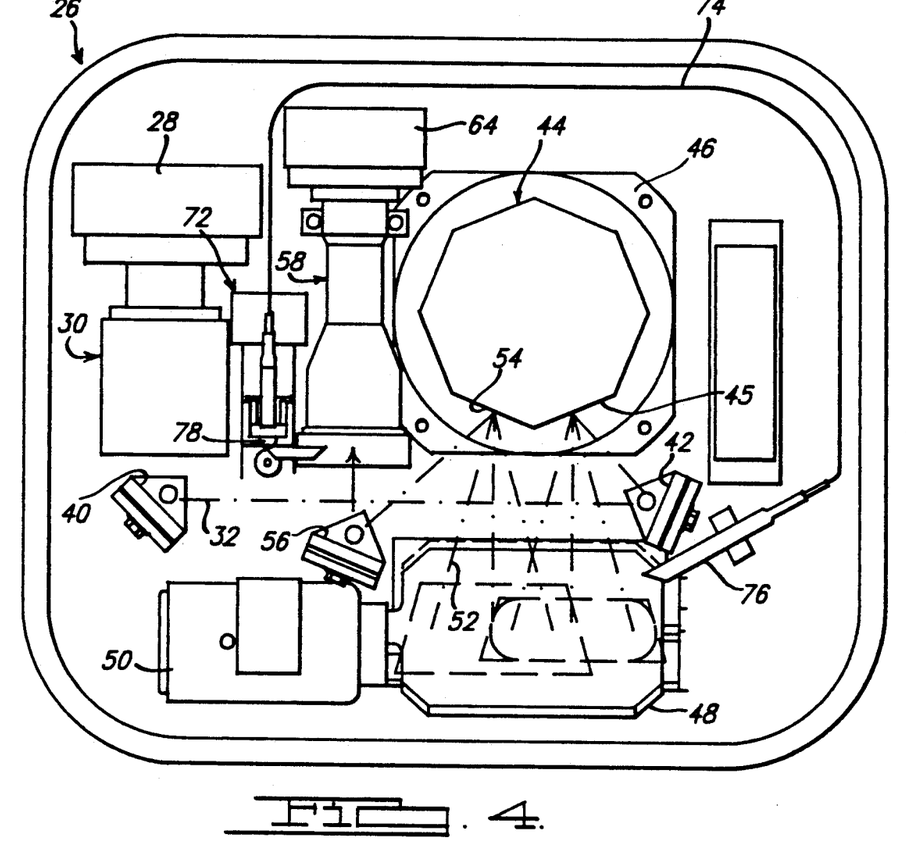
FIG. 4 is a diagrammatic view of the opto-mechanical portion of the LIDAR scanner shown in FIG. 1, in accordance with the invention.

Referring now to FIG. 4, the opto-mechanical portion 26 of the LIDAR scanning system 10 in accordance with a preferred embodiment of the present invention is shown. The source of the scanning beam is a conventional laser diode 28 that is amplitude modulated by modulation circuitry described below. For example, laser diode 28 may be a phased array laser diode operating at 810 nanometers in the near infrared region. The amount of laser power delivered to the target determines in part the system signal-to-noise ratio and therefore effects the quality of the resulting image. For example, for a system with a two meter standoff such as the bin picking application illustrated in FIG. 11, a laser 28 with an output of 200 milliwatts is generally adequate. It will be appreciated, however, that losses in the optical path will reduce a 200-milliwatt beam to about 80 milliwatts of power at the target.

Figure 5:
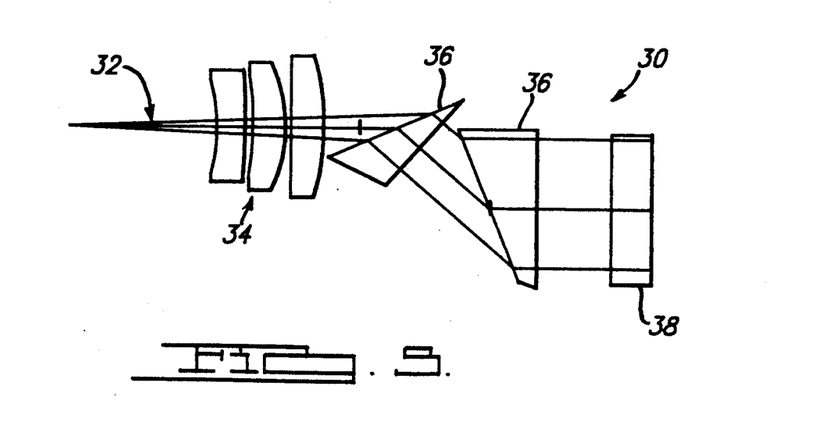
FIG. 5 is a diagram of the transmit telescope of the LIDAR scanner shown in FIG. 4.

The output of the laser diode 28 is directed into a transmit telescope 30 which collimates the laser output beam. FIG. 5 shows the transmit telescope 30 in more detail. The diverging beam from the laser diode 28 is shown at 32, first entering a 30-millimeter collimator 34 and then passing through a pair of brewster prisms 36 and a 3,533-millimeter focusing lens 38. The beam 32 is collimated just prior to focusing to avoid placing the brewster prisms in a convergent beam since they would then introduce astigmatism into the beam. The focusing lens 38 focuses the beam 32 onto the target to be scanned. It will be appreciated that the far field pattern of a laser diode indicates that the energy is divided between two lobes separated by a finite distance with almost no energy in this separation. As a result, the transmit optics capture only a portion of these two lobes. It is preferable, therefore, to tilt the laser diode 28 so that the transmit telescope 30 entirely captures one lobe, with a collection efficiency of about 92.5 percent for the single lobe.

From the transmit telescope 30, the beam 32 is reflected off a pair of folding mirrors 40, 42 which direct the beam to one facet 45 of a rotating polygon mirror 44, as shown in FIG. 4. A motor and drive circuitry, described below, is mounted to the reverse side of base 46 and causes the eight-sided polygon mirror 44 to rotate at a desired angular rate. The rotation of the polygon 44 transforms the laser beam 32 into a circular arc that, when intersecting a planar surface, creates a line scan for the lateral (x) image axis. For example, the eight-sided mirror 44 rotating at 31.9 Hz (1,914 rpm) will provide approximately 255 sweeps per second.

The transmitted beam 32 is reflected off the rotating mirror 44 onto a tilting mirror 48 which is mounted to a galvanometer servo motor 50. The axis of the tilting mirror is orthogonal to that of the polygon mirror 44. The tilting mirror motion creates the longitudinal (y) image axis. The tilting mirror, for example, may be rotated with a beam sweep rate of 8.9 degrees per second. Thus, it will be appreciated that the rotating polygon mirror produces a rapid X-axis scan of the laser beam while the tilting mirror causes the X-axis line scan to slowly sweep along the Y-axis.

The receive optics are focused to receive diffuse light from the spot on the object 12 illuminated by the transmitted beam 32 that is reflected off the tilting mirror 48 onto the adjacent facet of the polygon 44 and then reflected by the folding mirror 56. It will be appreciated that the incoming beam 52 will generally be about six orders of magnitude below the laser's output power (i.e., milliwatts transmitted become nanowatts received).

Figure 6:
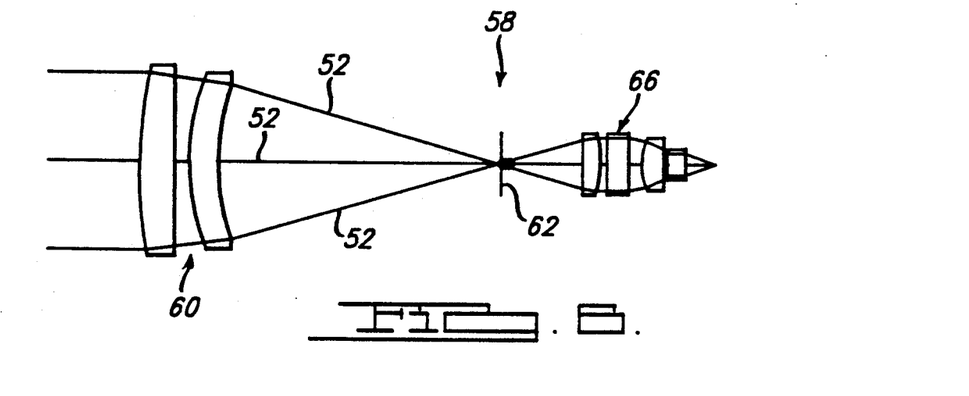
FIG. 6 is a diagram of the receive telescope of the LIDAR scanner shown in FIG. 4.

As shown in more detail in FIG. 6, the receive telescope 58 includes an objective lens 60 which may be, for example, a 54-millimeter objective lens which is focused at 4 meters. A field stop 62 is located at the image plane of the objective 60. The incoming beam 52 is then imaged onto a photodiode detector 64 by a relay lens 66 which may have, for example, a magnification of 0.6x. In addition, a narrow bandpass optical filter (not shown) may further be used to reduce background radiation.

Figure 7A:
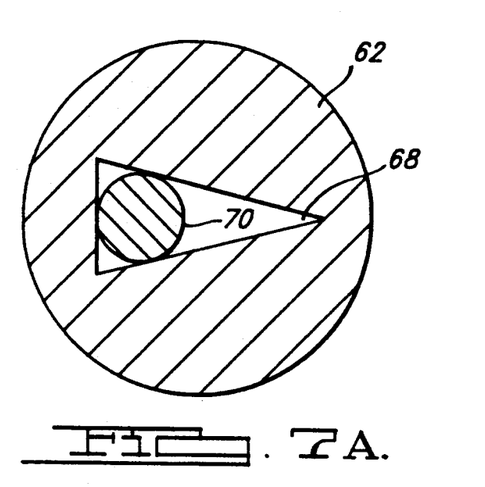
FIGS. 7A–7C are views of the field stop shown in FIG. 6 with images depicted at near, middle, and far ranges.
Figure 7B:
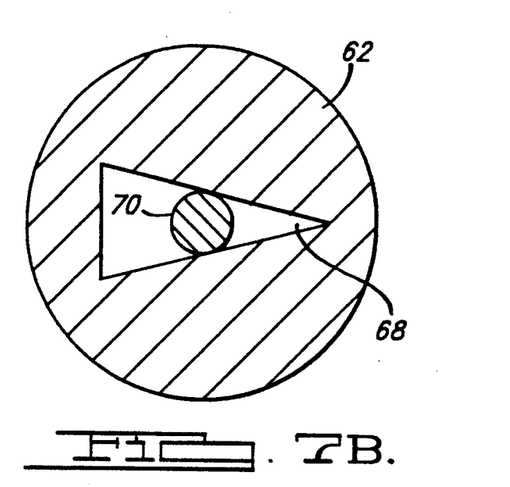
Figure 7C:
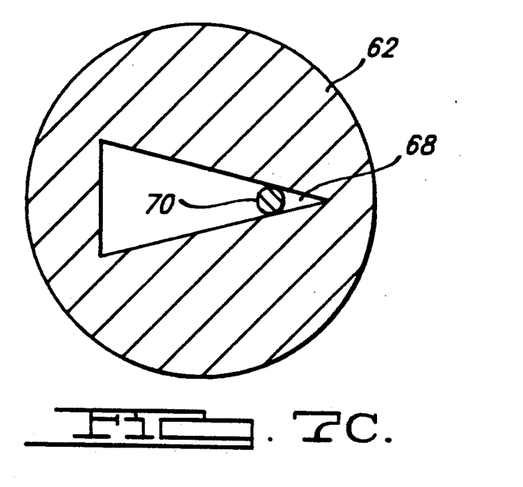

Referring now to FIGS. 7A-7C, the preferred field stop 62 in accordance with one embodiment of the present invention is shown. In FIG. 7A, field stop 62 is shown as a circular opaque disk with a triangular aperture 68 at its center. The laser spot 70 is shown as it would appear at near range located at the wide end of the aperture 68. As the distance to the object 12 increases, the image formed by the spot 70 moves toward the narrow portion of the aperture, due to the triangulation effect of the parallax angle between the output and input beams. Thus, FIG. 7B shows the laser spot 70 at mid range while FIG. 7C shows the spot at far range in the narrow portion of the aperture 68. In addition, it can be seen that as the spot moves from near range in FIG. 7A to far range in FIG. 7C, its size decreases due to the smaller magnification. The field stop 62 thus, as shown in FIGS. 7A-7C, is designed so that the edges of the image of the laser spot 70 are nearly tangent to the edges of the field stop aperture 68. The effect is to block as much extraneous background radiation from reaching the photo detector 64 as possible without reducing the strength of the received signal. This has the effect of improving the signal-to-noise ratio.

Referring again to FIG. 4, a zero reference system 72 is shown which is used to calibrate phase information of the received beam relative to the transmit beam 32. The zero reference system 72 includes a pair of fiber optic light pipes 74 which each capture a small but consistent portion of the trailing edge of the lateral (x) scan and feed it directly into the receive telescope 58. In particular, the transmit beam 32 enters the light pipes 74 at an input terminal aperture end 76 located adjacent to the tilting mirror 48. The light pipes 74 comprise a pair of 50 micrometer multimode graded index optical fibers with a numerical aperture of 0.2. The light passing through the fibers 74 is collimated by a pair of aspheric lenses 78 with a focal length of 3.2 millimeters. The collimated beams are then introduced into the receive telescope 58 through mirrors 80 and are focused onto the photodiode 64 using the same optics as the receive beam 52, but displaced off axis. These fibers 74 are significantly different in length so as to provide two fixed and known distance references for the LIDAR scanning system 10 to eliminate circuit drift. In other words, received light from each of these two fibers 74 exhibit a predetermined phase shift relative to the transmitted light signal in accordance with the preselected lengths of fiber optic cable used. In the preferred embodiment, the length of one of the fiber optic cables is selected to correspond to twice the distance to one extreme of the scanner measuring range and the length of the other fiber optic cable is selected to correspond to twice the distance to the other extreme of the scanner measuring range. The zero references are utilized by the electronics (described below) to calibrate the system after each X-axis line scan (i.e., 255 times each second).

In one embodiment of the present invention, the optomechanical scanning system 26 can provide an image frame size of 1,024 × 1,024 pixels, a pixel rate of 360,000 pixels per second, and a frame scan period of about 5 seconds. Also, a range accuracy of about 0.040 inches can be achieved.

Figure 8:
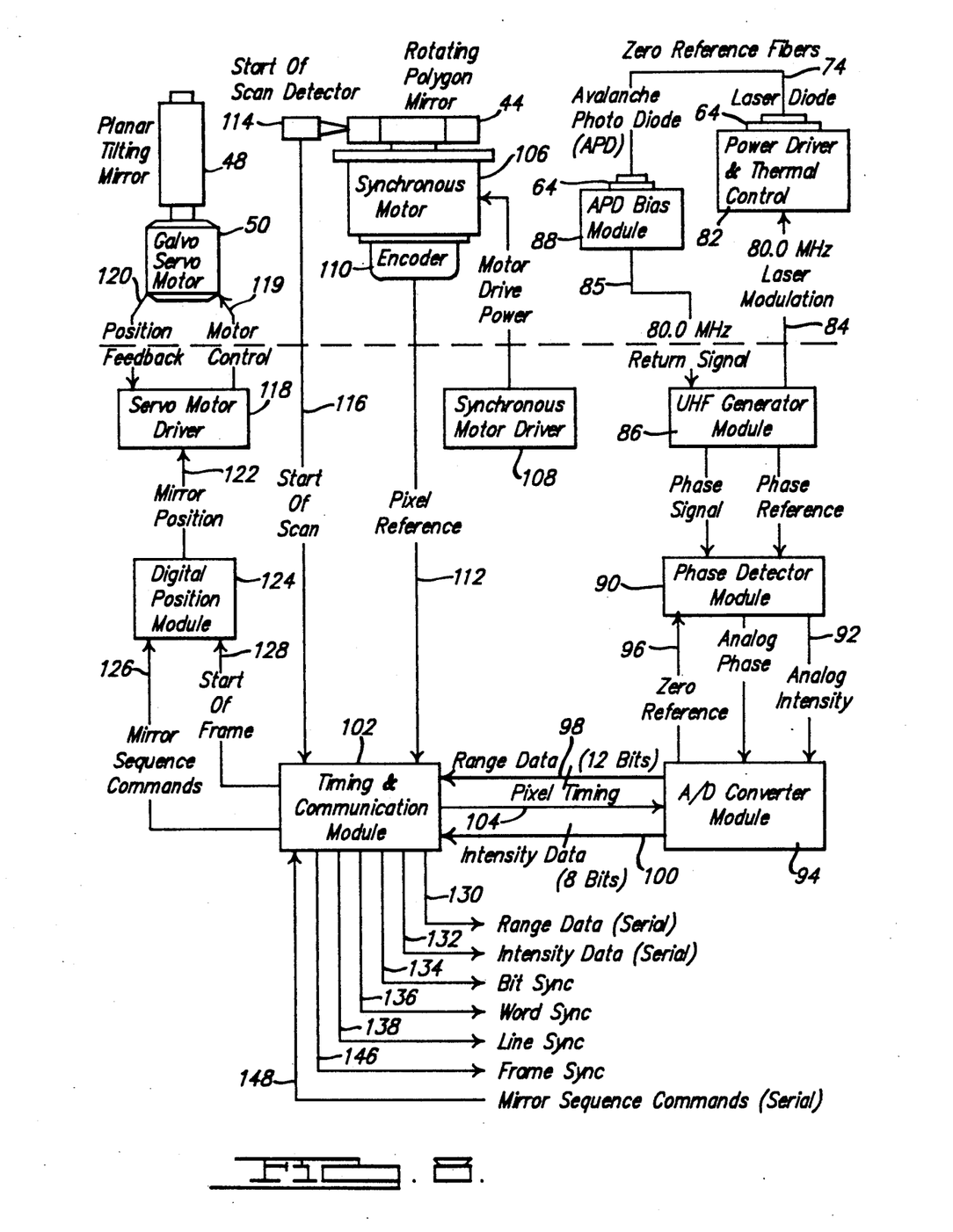
FIG. 8 is an overall block diagram of the LIDAR system shown in FIG. 1, including electronic circuits used to scanning apparatus.

Referring now to FIG. 8, the primary electronic circuits of the LIDAR scanner system 10 are shown. The laser diode 64 is shown mounted to a power driver and thermal control module 82. The circuits within this module utilize the photo detector, thermo-electric cooler, and thermistor that are typically integrated into a laser diode package to rigidly stabilize the laser's output power and case temperature. The tightly controlled DC power of the laser is then deeply modulated by an incoming signal 84 from a UHF generator 86.

The photodiode which may be, for example, an avalanche photodiode 64, is shown mounted to a voltage bias module 88. Avalanche photodiodes provide very low noise and high dynamic range for detecting the laser's diffuse return reflection. This is important since the power received by the photodiode 64 will typically be six orders of magnitude below the laser's output power. The UHF generator module 86 incorporates an ultra-stable 28 MHz crystal oscillator to frequency synthesize 90 MHz and 80 MHz signals. The 80 MHz signal is used to power modulate the laser diode. The 90 MHz signal is mixed with both the laser drive signal and the return signal detected by the avalanche photodiode 64 in order to frequency shift the signal and the reference channels down to 10 MHz where the analog phase detection occurs. Appropriate bandpass filtering is provided in this module 86 to remove the effects of ambient light and to minimize the proliferation of harmonics throughout the system that might result in phase errors.

A phase detector module 90 executes analog phase detection over a wide range of signal amplitudes and employs circuitry that eliminates error due to even harmonic distortion. The phase detector module 90 also provides a signal 92 that is proportional to the intensity of the detected signal. This intensity information signal 92 is utilized to refine range measurements as a function of signal magnitude and can also be used for gray scale imaging. The phase detector module 90 also receives the zero reference calibration signals 96 that are stripped off each data line by an A/D converter module 94. These zero reference signals 96 eliminate long-term drift from the system. In particular, the "measured" ranges of the two zero reference calibration signals are determined following each X-axis scan and compared with prestored values. Any variation observed between the measured values and the prestored values is then used to adjust the zero point and the slope of the voltage versus range line for the following X-axis scan.

The A/D converter module 94 provides two parallel channels of sample and hold A/D converters: 12 bits for phase (range) information 98 and 11 bits for intensity data 100. The phase measurement information is combined with the intensity information to provide an input address to a calibration table (not shown) which has prestored therein range correction data. As will subsequently be described in greater detail, the intensity data is used to compensate for the differential phase phenomenon inherent in the signal processing of the received signal to improve the accuracy of the system. The range and intensity data 98, 100 are transmitted to a timing and communication module 102 over parallel data lines 98, 100. Pixel timing is required for synchronizing the A/D converters with the system's rotating polygon mirror 44. In particular, the pixel timing signal on line 104 triggers the A/D converter module 94 to digitize the detected phase difference between the outgoing and incoming signals 1,024 times for each X-axis sweep of the laser beam.

The polygon mirror 44 is shown mounted to a hysteresis synchronous motor 106. This drive motor receives its power from a synchronous motor driver 108 which incorporates a low-jitter crystal oscillator to generate the stable mirror velocity. An incremental optical encoder 110 attached to the rear of the polygon motor 106 generates a high frequency pixel reference pulse stream on line 112 that is provided to the timing and communication module 102 and serves as a reference for the generation of the precise pixel timing pulses on line 104.

A start of scan detector 114 is provided which comprises a highly collimated narrow aperture laser diode and detector pair that creates a pulse at the center of each facet on the polygon 114. This signal is used to synthesize a precise line synch signal on the start of scan data line 116 provided to the timing and communication module 102. As will subsequently be described in greater detail, the start of scan signal on line 116 is used by the timing and communication module 102 to identify the start of the 1,024 pixel timing pulses on line 104 associated with each X-axis sweep.

The tilting mirror 48 is shown mounted to a galvo servo motor 50. The galvo servo motor 50 receives motion control voltages 119 from a servo motor driver 118 and closes the servo loop by feeding back a mirror position signal 120. The servo driver 118 receives digital position signals along line 122 from the digital position module 124 which derives the signals from the mirror sequence commands 126 received from the timing and communication module 102. In addition, the digital position module 124 receives a start of frame pulse signal on line 128 to synchronize the movement of the tilting mirror 48 with the rest of the system.

The timing and communication module 102 is incorporated to unify and synchronize the functions of all scanner 10 subsystems. It utilizes the pixel reference signal 112 to synthesize the pixel clock signal for the system. At the pixel rate, it receives the parallel range and intensity line signals 98, 100 and converts them to differential serial signals for transmission to a scanner interface (not shown) along lines 130 and 132. Within the timing and communication module 102, the bit, word, line, and frame signals 134, 136, 138, 140 are derived and transmitted to allow the scanner interface to properly register and store the image data. The timing and communication module 102 also receives the start of scan signal 116 and utilizes this for both line framing and for triggering the start of frame signal 128 for the tilting mirror 48. Finally, this module 102 receives differential serial mirror sequence commands 148 and converts them to single-ended serial command signals for use by the digital position module 124.

In addition, it will be appreciated that the timing and communication module 102 may also be used to implement a laser power speed interlock so that the scanner 10 will only generate at a constant "raster scan" mode. This may be accomplished, for example, by requiring the polygon mirror 44 to be in motion for the laser to operate. As a result, the scanner 10 can be considered to operate as a pulsed laser device.

Figure 9:
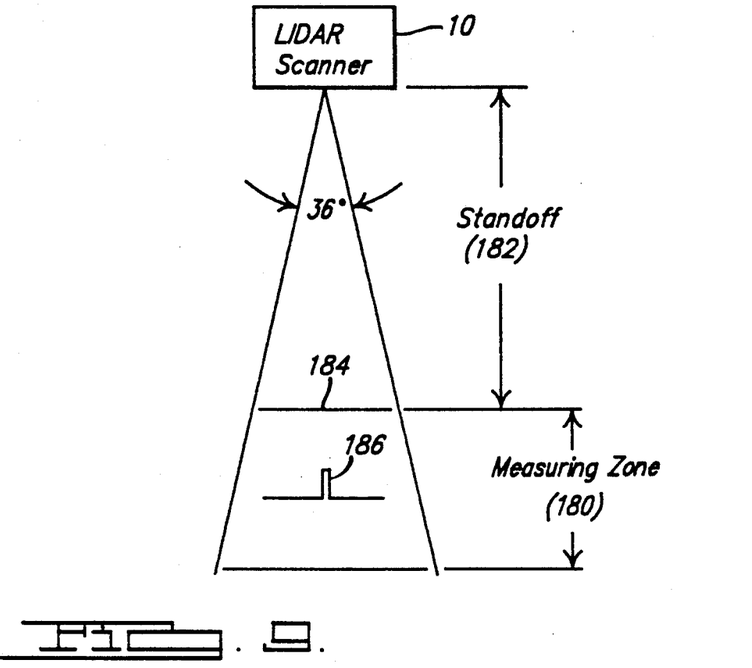
FIG. 9 is a diagram illustrating a typical measuring zone of the scanner according to the present invention.

With additional reference to FIG. 9, the manner in which the scanner standoff is established will now be explained. As previously noted, it is desirable to calibrate the scanner so that an ambiguity interval does not occur within the desired measuring zone. For example, in a typical application with the scanner 10 operating at a modulation frequency of 147.5 MHz, the depth of the desired measuring zone 180 may be 40 inches and the desired standoff distance 182 from the scanner 10 to the measuring zone 180 may be 76 inches. To calibrate the scanner for this type of application, it is necessary to locate an ambiguity interval substantially coincident with the top 184 of the measuring zone 180. This is readily accomplished in the following manner. With additional reference to FIG. 8, it will be recalled that the photodiode bias module 88 supplies the return signal received by the photodiode 64 to the phase detection circuitry 86 and 90. The physical length of the electrical cable 85 used to carry this signal, therefore, has a direct influence on the relative phase difference between the incoming and outgoing signals observed by the phase detector module 90. In other words, a direct relationship exists between the length of the cable 85 and the amount of phase delay introduced into the return signal as observed by the phase detector 90. Accordingly, to properly locate the position of an ambiguity interval relative to the desired measuring zone 180, a target is positioned at or slightly above the top 184 of the measuring zone 180 and the length of the cable 85 is adjusted until phase coincidence between the outgoing signal and the return signal off the target is observed. Thereupon, range data for the scanner 10 is determined relative to this known range position.

As previously noted, it is additionally necessary when calibrating the scanner 10 to synchronize the encoder pulses produced by the optical encoder 110 with the start of scan signal on line 116. In particular, it will be recalled that the sequence of 1,024 pixel timing pulses produced on line 104 is derived by the timing and communication module 102 from the encoder pulses received on line 112. The encoder pulses, of course, define the angular position of the rotating polygon mirror 44. Accordingly, it is important that the sequence of 1,024 pixel timing pulses, which define the sample points of each X-axis line scan, occur in synchronization with the laser beam as it is swept across the measuring zone by each of the facets on the polygon mirror 44. To accomplish this, a target 186 is placed in a known position within the measuring zone 180 of the scanner, typically in the center of the field of view of the scanner optics. A single X-axis line scan is then generated (with the tilting mirror mechanism temporarily disabled) across the target and the position of the target determined relative to the start of scan ("SOS") pulse. Since the target 186 was placed in the center of the scanner's field of view, the starting point of the X-axis scan is selected to be 512 pixel timing pulses (i.e., one-half of 1,024) before the target. The number of pixel timing pulses between this start point and the SOS pulse is then stored and used thereafter to determine the starting point of the X-axis scan relative to the SOS pulse. In other words, the timing and communication module 102 counts a predetermined number of pixel timing pulse periods after a SOS pulse is received on line 116 before initiating the sequence of 1,024 pixel timing pulses on line 104 which define the sampling points of each X-axis scan. Thus, it will be appreciated that the SOS pulse can occur at any time during a scan, as long as it occurs at the same relative point during each scan. In this manner, it becomes unnecessary to critically align the position of the optical encoder 110 on the shaft of the polygon motor 106.

As noted previously, the phase detector module 90, in addition to producing an analog output signal proportional to the phase difference between the outgoing and incoming signals, also produces an analog output signal on line 92 that is proportional to the intensity of the detected signal. This intensity signal is used to determine an error factor in the range signal. In particular, due to an observed phenomenon known as "differential phasing", the measured phase delay in the processed signal will vary in accordance with the amplitude of the signal. In other words, if left uncorrected, the LIDAR scanner would measure different ranges for objects having different levels of reflectivity even though the objects were placed in identical locations. To correct for this and thus improve the accuracy of the system, an error correction table is programmed into a PROM during initial calibration of the scanner. The error correction data is addressed in accordance with the observed or measured intensity and range/phase data. In other words, the error correction look-up table provides a predetermined corrected range value for any given combination of measured range and intensity values. The data for the error correction table can be generated during calibration of the scanner by placing a calibration target having a variety of random intensity markings in one or more known locations within the field of view of the scanner. Given that the target is in a known location, the phase error for various measured intensity and range values can then be readily calculated.

Figure 10:
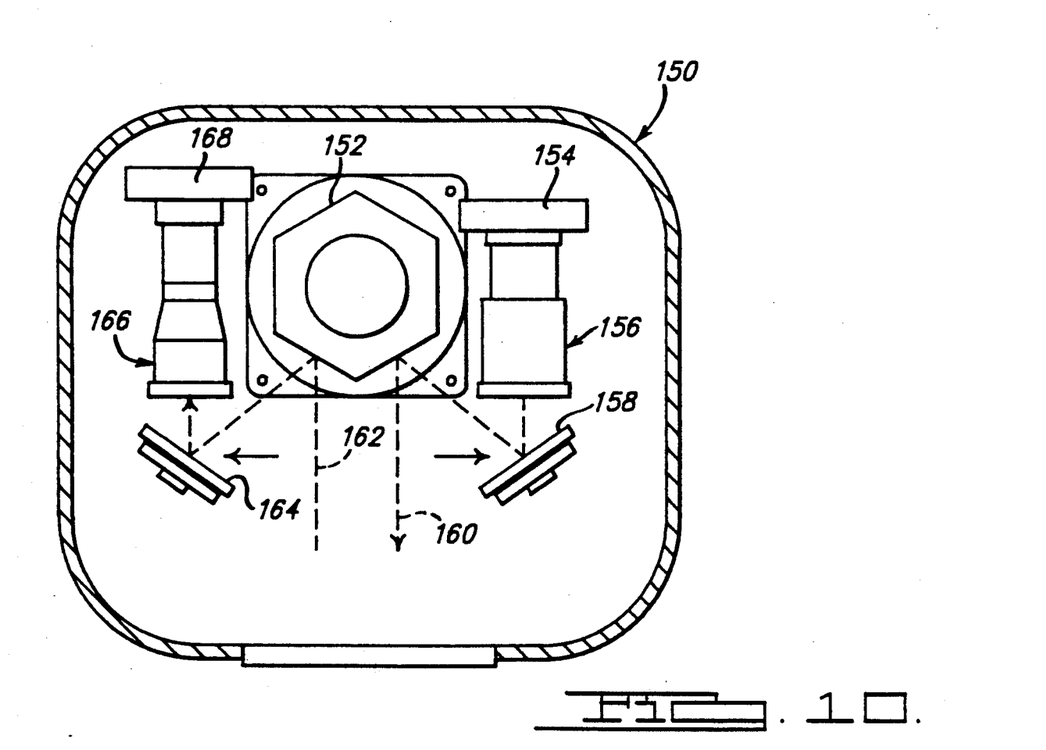
FIG. 10 is a LIDAR scanner in accordance with a second embodiment of the present invention for generating a linear line scan pattern.

Referring now to FIG. 10, there is shown an alternative opto-mechanical system 150 for generating linear line scan patterns. This greatly simplified system 150 includes a polygon mirror 152, a transmit laser photodiode 154, transmit telescope 156, and folding mirror 158 for directing the transmitted beam 160 along a linear scan path. The received beam 162 is reflected off a different facet of the polygon mirror 152 onto a folding mirror 164 and into the receive telescope 166 where it is detected by the photodiode 168. This line scan embodiment 150 generates a single axis line scan in the x direction only. This greatly simplified system 150 would find applications where the single axis scanner 150 is moved past a scene to be measured or, conversely, where the scene is moving past the scanner 150 to generate the Y-axis scans.

Figure 11:
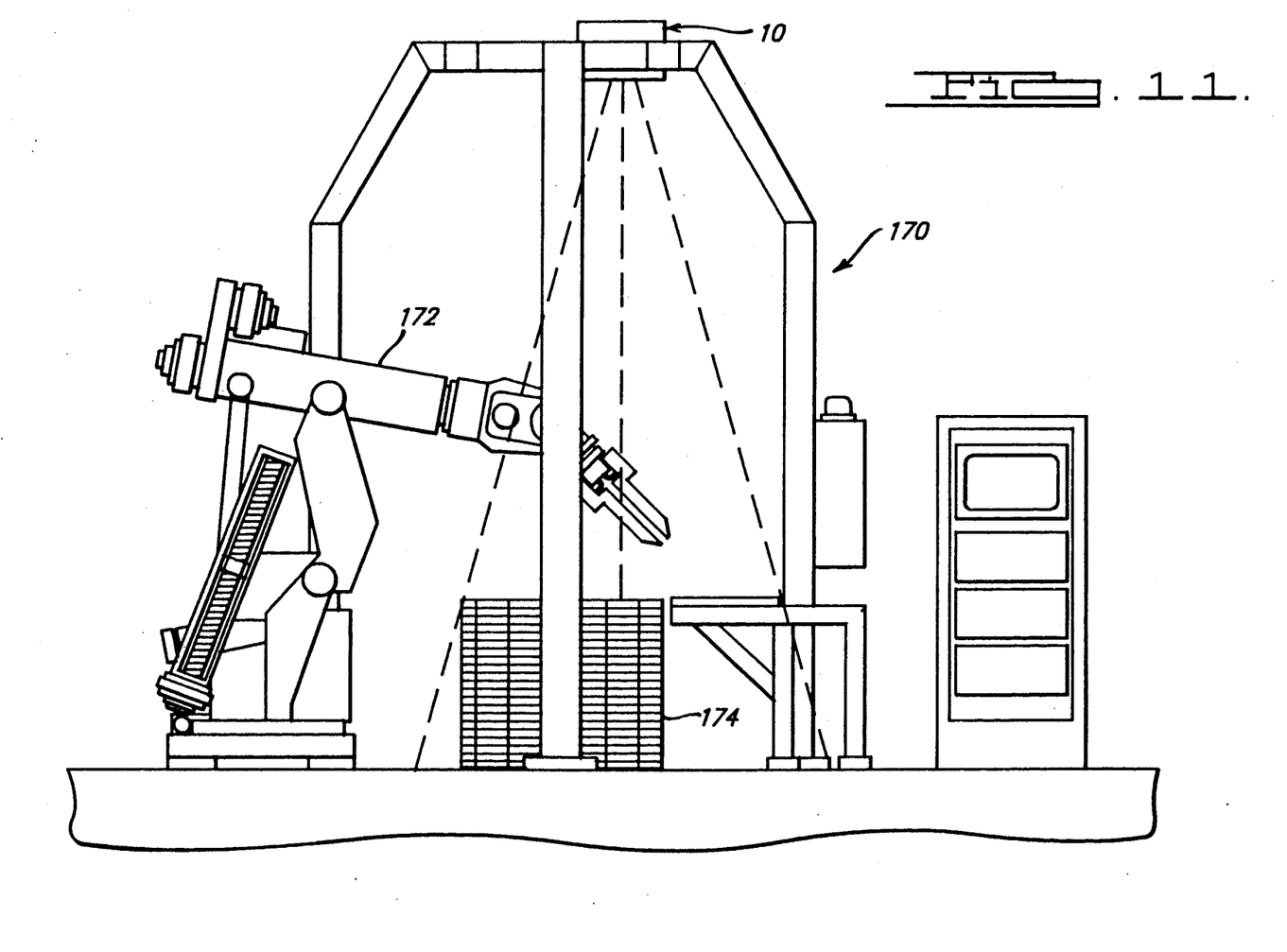
FIG. 11 is a block diagram of a robot bin picking cell using the LIDAR scanner in accordance with the present invention.

Referring now to FIG. 11, there is shown a robotic bin picking cell system 170 utilizing the LIDAR scanner system 10 in accordance with the present invention. In particular, a conventional robot 172 is coupled to the LIDAR scanner system 10 to be guided to remove parts from a scanned bin 174.

To take full advantage of the scanning speed of the LIDAR scanner 10 in accordance with the present invention, the scanning system 10 may be interfaced with a high speed image processor such as an AISI 5000 image processor. This single instruction multiple data (SIMD) parallel processor incorporates 1,024 simultaneously operating individual processors, and is capable of 3.5 billion operations per second. Such speeds make it practical to quickly analyze the detailed, high resolution three-dimensional images provided by the LIDAR system 10.

While the above description constitutes the preferred embodiments of the present invention, it will be appreciated that the invention is susceptible to modification, variation, and change without departing from the proper scope and fair meaning of the claims.

What is claimed is:

1. A LIDAR scanning system for providing a three-dimensional image of a surface, said system comprising:
    a modulated light source;
    a light detector;
    a rotating multifaceted mirror including a first facet reflecting light emitted from said light source onto said surface, and a second facet receiving diffuse light reflected back from said surface, said diffuse light received by said second facet being reflected to said light detector; and
    range determining means for determining the range of said surface relative to a predetermined datum in accordance with the state of modulation of the light received by said light detector relative to the modulated light emitted by said light source, and including zero reference means comprising a pair of fiber optic light pipes of differing predetermined lengths for receiving light at first terminals thereof located adjacent to said modulated light source and emitting light from second terminals thereof located adjacent to said light detector for providing reference signals to said light detector having known states of modulation.

2. The LIDAR scanning system of claim 1 wherein said modulated light source is amplitude modulated and said range determining means includes means for determining the phase shift of the received light relative to the emitted light.

3. The LIDAR scanning system of claim 1 wherein said second facet is adjacent to said first facet on said multifaceted mirror.

4. The LIDAR scanning system of claim 1 further comprising a generally triangular-shaped aperture positioned in front of said light detector for partially blocking extraneous light surrounding said diffuse light received from said surface, wherein said aperture is oriented so that said received light shifts from the larger portion of said triangular aperture to the narrower portion of said triangular aperture as the distance of said surface from the scanner increases.

5. The LIDAR scanning system according to claim 2 wherein said range determining means further includes means for determining the intensity of said received light and range correction means for determining the corrected range of said surface in accordance with said determined intensity and phase shift.

6. A LIDAR scanning system for providing a three-dimensional image of a surface, comprising:

a multifaceted mirror rotationally driven at a predetermined rotational speed;

a modulated laser light source for producing a collimated beam of light;

transmitting optics for focusing said beam of light onto a first facet of said rotating multifaceted mirror such that said beam of light is reflected off said first facet onto said surface thereby creating a light image on said surface that is scanned over said surface along a first axis;

a light detector;

receiving optics focused on a second facet of said rotating multifaceted mirror for directing diffuse light reflected off said surface onto said light detector thereby providing said detector with a focused view of said light image as it is scanned over said surface along said first axis;

a generally triangular-shaped aperture positioned in front of said light detector for partially blocking extraneous light surrounding said diffuse light image, wherein said aperture is oriented so that the received light image shifts from the larger portion of the aperture to the smaller portion of the aperture as the distance of said surface from the scanner increases; and range-determining means for determining the range relative to a predetermined datum of each point on said surface illuminated by said light image in accordance with the state of modulation of the reflected light received by said light detector relative to the modulated light emitted by said light source.

7. The LIDAR scanning system of claim 6 further including a pivoting mirror pivotably mounted on an axis orthogonal to the axis of rotation of said multifaceted mirror and positioned so as to reflect the beam of light reflected off said first facet onto said surface and to reflect the diffuse light reflected off said surface onto said second facet.

8. The LIDAR scanning system of claim 7 wherein said pivoting mirror causes said light image on said surface to simultaneously scan over said surface along a second axis perpendicular to said first axis.

9. The LIDAR scanning system of claim 8 wherein said multifaceted mirror is rotated at a relatively high rotational speed and said pivoting mirror is pivoted at a relatively slow angular speed.

10. The LIDAR scanning system of claim 6 wherein said first second facets comprise adjacent facets on said multifaceted mirror.

11. The LIDAR scanning system of claim 6 wherein said modulated light source is amplitude modulated and said range determining means includes means for determining the phase shift of the received light relative to the emitted light.

12. The LIDAR scanning system of claim 11 wherein said range determining means further includes zero reference means comprising a pair of fiber optic light pipes of differing predetermined lengths for receiving light at first terminals thereof located adjacent to said modulated light source and emitting light from second terminals thereof located adjacent to said light detector for providing reference signals to said light detector having known states of modulation.

13. The LIDAR scanning system of claim 11 wherein said range determining means further includes means for determining the intensity of said received light and range correction means for determining the corrected range of said surface in accordance with said determined intensity and phase shift.

* * * * *